(12) United States Patent
Byun et al.

(10) Patent No.: US 11,517,861 B2
(45) Date of Patent: Dec. 6, 2022

(54) WATER TREATMENT SEPARATION MEMBRANE, WATER TREATMENT MODULE COMPRISING SAME, AND MANUFACTURING METHOD THEREFOR

(71) Applicant: LG CHEM, LTD., Seoul (KR)

(72) Inventors: Eunkyoung Byun, Daejeon (KR);
Youngju Lee, Daejeon (KR);
Hyungjoon Jeon, Daejeon (KR);
Young Jun Shin, Daejeon (KR);
Chong Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 245 days.

(21) Appl. No.: 16/756,264

(22) PCT Filed: Jul. 9, 2019

(86) PCT No.: PCT/KR2019/008408
§ 371 (c)(1),
(2) Date: Apr. 15, 2020

(87) PCT Pub. No.: WO2020/013562
PCT Pub. Date: Jan. 16, 2020

(65) Prior Publication Data
US 2020/0254397 A1    Aug. 13, 2020

(30) Foreign Application Priority Data

Jul. 9, 2018 (KR) .................. 10-2018-0079514

(51) Int. Cl.
| | |
|---|---|
| *B01D 67/00* | (2006.01) |
| *B01D 69/02* | (2006.01) |
| *B01D 69/10* | (2006.01) |
| *B01D 71/56* | (2006.01) |
| *C02F 1/44* | (2006.01) |

(52) U.S. Cl.
CPC ......... *B01D 71/56* (2013.01); *B01D 67/0006* (2013.01); *B01D 67/0088* (2013.01); *B01D 69/02* (2013.01); *B01D 69/10* (2013.01); *C02F 1/44* (2013.01); *B01D 2323/22* (2013.01);
(Continued)

(58) Field of Classification Search
CPC .......................... B01D 67/0088; B01D 71/56; B01D 2323/36; B01D 2325/28
See application file for complete search history.

(56) References Cited

U.S. PATENT DOCUMENTS

| | | |
|---|---|---|
| 5,876,602 A | 3/1999 | Jons et al. |
| 7,708,150 B2 | 5/2010 | Kurth |

(Continued)

FOREIGN PATENT DOCUMENTS

| | | |
|---|---|---|
| CA | 2811723 | 4/2012 |
| CN | 101052459 | 10/2007 |

(Continued)

*Primary Examiner* — Bradley R Spies
(74) *Attorney, Agent, or Firm* — Dentons US LLP

(57) ABSTRACT

Provided is a water-treatment membrane including a porous support; and a polyamide active layer including chlorine on a surface thereof, wherein CIE L*a*b* color coordinate values after storing for 30 days or longer at 25° C. to 80° C. satisfy Equation 1 to Equation 3:

$91 < L^* < 97$  <Equation 1>

$-1.5 < a^* < 1.5$  <Equation 2>

$-1.5 < b^* < 8$  <Equation 3> of the present disclosure, a water-treatment module including the same, and a method for manufacturing the same.

8 Claims, 2 Drawing Sheets

(52) U.S. Cl.
CPC ...... *B01D 2323/36* (2013.01); *B01D 2323/46* (2013.01); *B01D 2325/28* (2013.01)

(56) References Cited

U.S. PATENT DOCUMENTS

| | | | |
|---|---|---|---|
| 8,029,857 | B2 | 10/2011 | Hoek et al. |
| 2001/0050252 | A1 | 12/2001 | Mickols |
| 2007/0284309 | A1 | 12/2007 | Tomioka |
| 2008/0251447 | A1 | 10/2008 | Koumoto et al. |
| 2011/0005997 | A1 | 1/2011 | Kurth et al. |
| 2012/0080381 | A1 | 4/2012 | Wang et al. |
| 2013/0146530 | A1 | 6/2013 | Wang et al. |
| 2014/0231338 | A1 | 8/2014 | Takaya et al. |
| 2017/0252705 | A1 | 9/2017 | Song et al. |
| 2017/0361284 | A1 | 12/2017 | Lee et al. |

FOREIGN PATENT DOCUMENTS

| | | |
|---|---|---|
| CN | 103124590 | 5/2013 |
| CN | 103842062 | 6/2014 |
| CN | 103894073 | 7/2014 |
| CN | 104906957 | 9/2015 |
| CN | 105848767 | 8/2016 |
| CN | 106345299 | 1/2017 |
| CN | 106582315 | 4/2017 |
| EP | 2276558 A2 | 1/2011 |
| JP | S63-54905 | 3/1988 |
| JP | H05329344 | 12/1993 |
| JP | H07114941 | 12/1995 |
| JP | 2003-038917 | 2/2003 |
| JP | 2008-093543 | 4/2008 |
| JP | 2008080187 | 4/2008 |
| JP | 2008-517737 | 5/2008 |
| JP | 4147766 | 9/2008 |
| JP | 2010196257 | 9/2010 |
| JP | 2014-500131 | 1/2014 |
| JP | 2015-180495 | 10/2015 |
| JP | 2017-500198 | 1/2017 |
| KR | 10-19990070132 | 9/1999 |
| KR | 10-20010031737 | 4/2001 |
| KR | 10-20100073795 | 7/2010 |
| KR | 10-2014-0073011 | 6/2014 |
| KR | 10-20150076123 | 7/2015 |
| KR | 10-20160039788 | 4/2016 |
| KR | 10-20170047114 | 5/2017 |
| KR | 10-20170100851 | 9/2017 |
| KR | 10-20180036295 | 4/2018 |
| KR | 10-20180124525 | 11/2018 |
| WO | 2009-129354 | 10/2009 |
| WO | 2012-047359 | 4/2012 |
| WO | 2015-114727 | 8/2015 |
| WO | 2017-150885 | 9/2017 |

[FIG. 1]
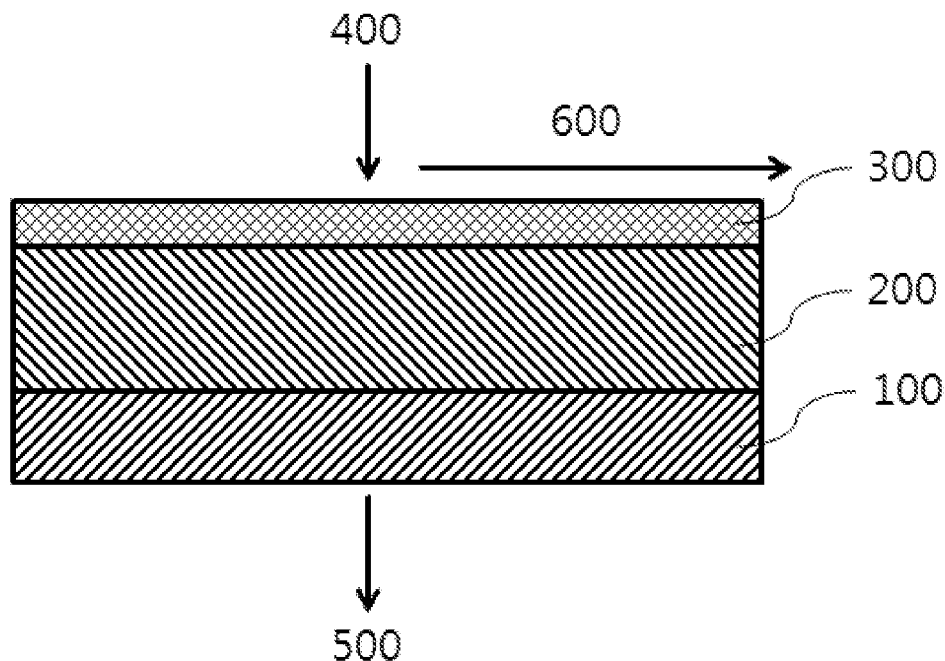
[FIG. 2]
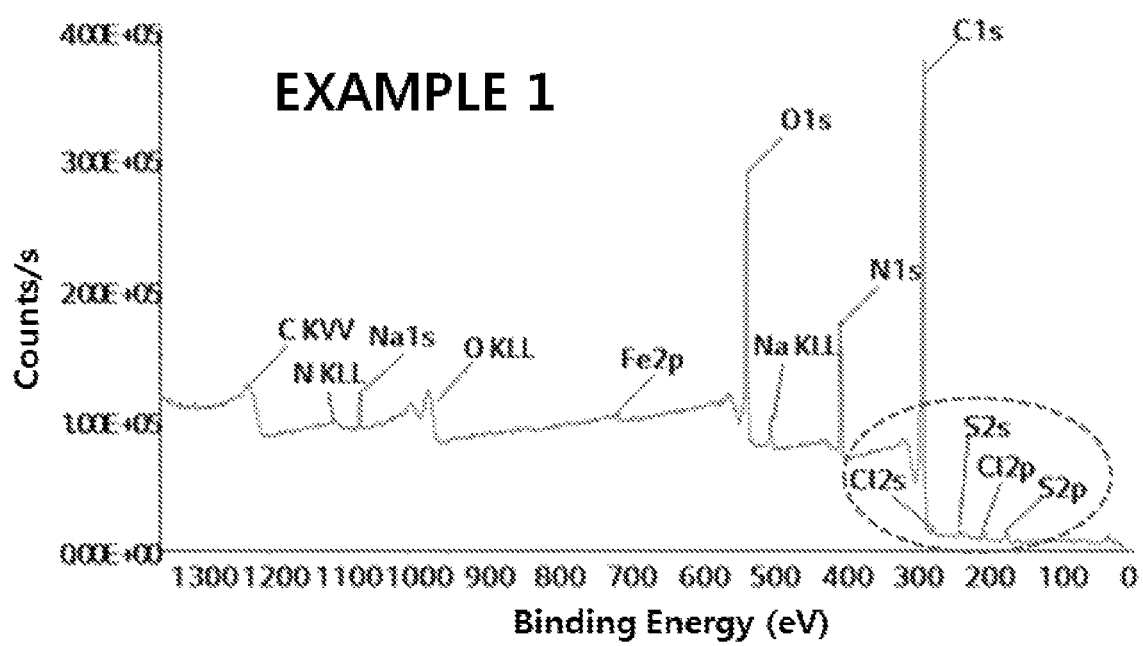

[FIG. 3]
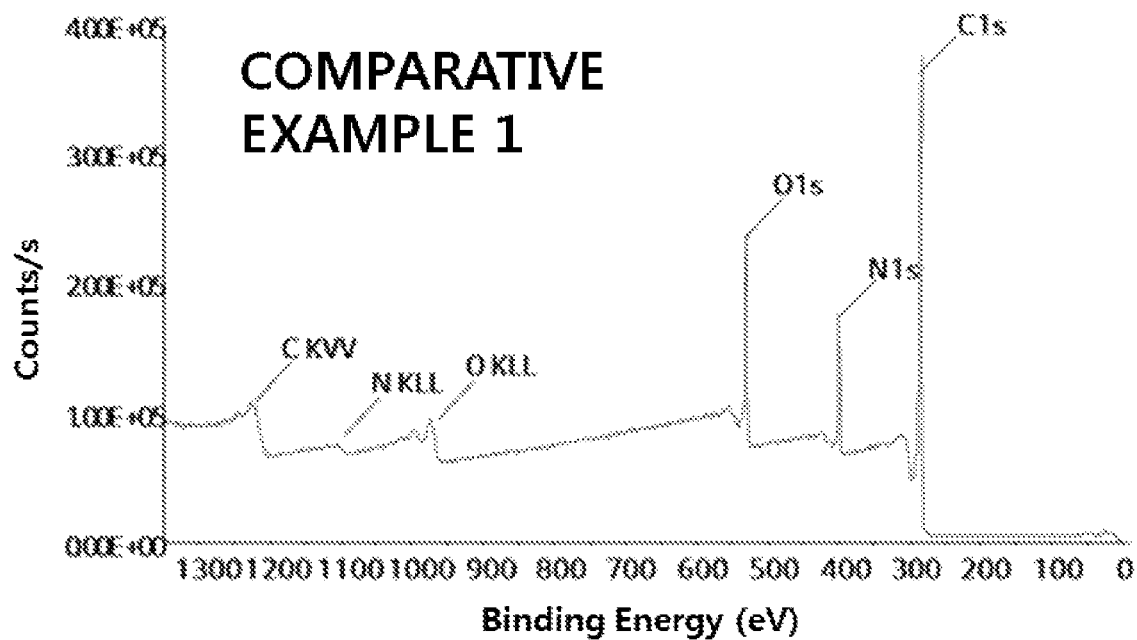

WATER TREATMENT SEPARATION MEMBRANE, WATER TREATMENT MODULE COMPRISING SAME, AND MANUFACTURING METHOD THEREFOR

CROSS-REFERENCE TO RELATED APPLICATIONS

This application is a National Stage Application of International Application No. PCT/KR2019/008408 filed on Jul. 9, 2019, which claims priority to and the benefits of Korean Patent Application No. 10-2018-0079514, filed with the Korean Intellectual Property Office on Jul. 9, 2018, the entire contents of which are incorporated herein by reference.

TECHNICAL FIELD

The present specification relates to a water-treatment membrane, a water-treatment module including the same, and a method for manufacturing the same.

BACKGROUND

A phenomenon that a solvent moves from, between two solutions separated by a semi-permeable membrane, a solution with a low solute concentration to a solution with a high solute concentration through the membrane is referred to as an osmosis phenomenon, and herein, a pressure working on the side of the solution with a high solute concentration due to the solvent migration is referred to as an osmotic pressure. However, when applying an external pressure higher than an osmotic pressure, the solvent moves toward the solution with a low solute concentration, and this phenomenon is referred to as reverse osmosis. Using a reverse osmosis principle, various salts or organic substances can be separated through a semi-permeable membrane with a pressure gradient as a driving force. A water-treatment membrane using such a reverse osmosis phenomenon has been used to supply water for household, construction and industry after separating substances at a molecular level and removing salts from salt water or sea water.

Typical examples of such a water-treatment membrane can include a polyamide-based water-treatment membrane, and the polyamide-based water-treatment membrane is manufactured using a method of forming a polyamide active layer on a microporous support. More specifically, the polyamide-based water-treatment membrane is manufactured using a method of forming a polysulfone layer on a non-woven fabric to form a microporous support, dipping this microporous support into an aqueous m-phenylenediamine (hereinafter, mPD) solution to form an mPD layer, and dipping this again into an organic trimesoyl chloride (TMC) solvent, bringing the mPD layer into contact with the TMC, and interfacial polymerizing the result to form a polyamide active layer.

The polyamide active layer has a great effect on salt rejection and flux, indicators representing performance of a polyamide-based water-treatment membrane, and studies thereon have been continuously ongoing.

BRIEF DESCRIPTION

Technical Problem

The present specification is directed to providing a water-treatment membrane, a water-treatment module including the same, and a method for manufacturing the same.

Technical Solution

One embodiment of the present specification provides a water-treatment membrane including, a porous support; and a polyamide active layer provided on the porous support and including chlorine on a surface thereof, wherein CIE L*a*b* color coordinate values after storing for 30 days or longer at 25° C. to 80° C. satisfy the following <Equation 1> to <Equation 3>.

$$91 < L^* < 97 \qquad \text{<Equation 1>}$$

$$-1.5 < a^* < 1.5 \qquad \text{<Equation 2>}$$

$$-1.5 < b^* < 8 \qquad \text{<Equation 3>}$$

Another embodiment of the present specification provides a water-treatment module including one or more of the water-treatment membranes.

Another embodiment of the present specification provides a method for manufacturing a water-treatment membrane, the method including, (a) forming a polyamide active layer on a porous support by interfacial polymerizing an amine compound and an acyl halide compound;

(b) pretreating the polyamide active layer by bringing the polyamide active layer into contact with a pretreatment solution including water; and (c) bringing a hypochlorite solution having a concentration of 50 ppm to 450 ppm into contact with the pretreated polyamide active layer.

Another embodiment of the present specification provides a method for manufacturing a water-treatment module, the method including, (a) forming a polyamide active layer on a porous support by interfacial polymerizing an amine compound and an acyl halide compound;

(b) pretreating the polyamide active layer by bringing the polyamide active layer into contact with a pretreatment solution including water;

(c) manufacturing a water-treatment membrane by bringing a hypochlorite solution having a concentration of 50 ppm to 450 ppm into contact with the pretreated polyamide active layer; and (e) rolling the water-treatment membrane in one or more layers.

Advantageous Effects

A water-treatment membrane manufactured according to one embodiment of the present specification has excellent salt rejection and flux, and has an advantage of excellent durability due to a small degree of discoloration.

In addition, according to one embodiment of the present specification, there is an advantage in that use of a hypochlorite process can be detected through color coordinate values.

DESCRIPTION OF DRAWINGS

FIG. 1 illustrates a water-treatment membrane according to one embodiment of the present specification.

FIG. 2 and FIG. 3 respectively present elemental analysis results on water-treatment membranes according to Example 1 and Comparative Example 1 of the present application.

REFERENCE NUMERALS

100: Non-Woven Fabric
200: Porous Support
300: Polyamide Active Layer
400: Raw Water Including Impurities
500: Purified Water
600: Concentrated Water

DETAILED DESCRIPTION

Hereinafter, the present specification will be described in more detail.

In the present specification, a description of a certain member being placed 'on' another member includes not only a case of the certain member adjoining the another member but a case of still another member being present between the two members.

In the present specification, a description of a certain part 'including' certain constituents means capable of further including other constituents, and does not exclude other constituents unless particularly stated on the contrary.

In the present specification, being measured 'at the beginning' or 'immediately after' means, unless mentioned otherwise, being measured within 3 minutes after the corresponding step is completed.

In the present specification, a 'moisture content of water-treatment membrane' measured immediately after a specific step means a moisture content for a sample completed up to the corresponding step. For example, a moisture content of a water-treatment membrane measured immediately after step (a) means a moisture content of a sample completed only up to a process of forming a polyamide active layer on a porous support.

In one embodiment of the present specification, a method for manufacturing a water-treatment membrane includes, (a) forming a polyamide active layer on a porous support by interfacial polymerizing an amine compound and an acyl halide compound;

(b) pretreating the polyamide active layer by bringing the polyamide active layer into contact with a pretreatment solution including water; and (c) bringing a hypochlorite solution having a concentration of 50 ppm to 450 ppm into contact with the pretreated polyamide active layer.

When pretreating the polyamide active layer with a solution including water; or water and a salt according to one embodiment of the present specification, a swelling effect of the active layer is induced during the pretreatment process, which is effective in enhancing flux.

In addition, when bringing a hypochlorite solution into contact with the pretreated polyamide active layer according to one embodiment of the present specification, chloride ions bond in the active layer ultimately enhancing salt rejection and flux of a water-treatment membrane.

(a) Forming Polyamide Active Layer on Porous Support

In one embodiment of the present specification, the porous support can be prepared by coating a polymer material on a non-woven fabric, and type, thickness and porosity of the non-woven fabric can diversely vary as necessary.

Examples of the polymer material can include polysulfone, polyethersulfone, polycarbonate, polyethylene oxide, polyimide, polyetherimide, polyetheretherketone, polypropylene, polymethylpentene, polymethyl chloride, polyvinylidene fluoride and the like, but are not limited thereto.

In one embodiment of the present specification, the polymer material can be polysulfone.

In one embodiment of the present specification, the forming of a polyamide active layer can be conducted by interfacial polymerizing an amine compound and an acyl halide compound, and specifically, can include forming an aqueous solution layer including an amine compound on the porous support; and bringing an organic solution including an acyl halide compound and an organic solvent into contact with the aqueous solution layer thereon.

When bringing the organic solution into contact with the aqueous solution layer, polyamide is produced by interfacial polymerization while the amine compound coated on the porous support surface and the acyl halide compound react, and the polyamide is adsorbed on the microporous support to form a thin film. As a method of the contact, a method of dipping, spraying, coating or the like can be used.

According to one embodiment of the present specification, coating an additive such as triethylammonium camphorsulfonate (TEACSA) can be further included after preparing a porous support and before the forming of a polyamide active layer on the porous support, that is, before coating an aqueous solution including an amine compound on the support.

In one embodiment of the present specification, a method for forming the aqueous solution layer including an amine compound on the porous support is not particularly limited, and methods capable of forming an aqueous solution layer on a support can be used without limit. Specifically, spraying, coating, dipping, dropping or the like can be used.

In one embodiment of the present specification, the amine compound is not limited as long as it can be used in polyamide polymerization, however, examples thereof can include m-phenylenediamine (mPD), p-phenylenediamine (PPD), 1,3,6-benzenetriamine (TAB), 4-chloro-1,3-phenylenediamine, 6-chloro-1,3-phenylenediamine, 3-chloro-1, 4-phenylenediamine or mixtures thereof, and preferably, the amine compound can be m-phenylenediamine (mPD).

In one embodiment of the present specification, a content of the amine compound can be from 0.1 wt % to 20 wt %, preferably from 1 wt % to 15 wt %, and more preferably from 3 wt % to 10 wt % based on 100 wt % of the aqueous solution including an amine compound.

When the amine compound content is in the above-mentioned range, a uniform polyamide active layer can be prepared.

In one embodiment of the present specification, the aqueous solution layer can further go through removing an excess amine compound-including aqueous solution as necessary. The aqueous solution layer formed on the porous support can be non-uniformly distributed when there are too much of the aqueous solution present on the support, and when the aqueous solution is non-uniformly distributed, a non-uniform polyamide active layer can be formed by subsequent interfacial polymerization. Accordingly, the excess aqueous solution is preferably removed after forming the aqueous solution layer on the support. A method of removing the excess aqueous solution is not particularly limited, however, methods using a sponge, an air knife, nitrogen gas blowing, natural drying, a compression roll or the like can be used.

The acyl halide compound is not limited as long as it can be used in polyamide polymerization, however, an aromatic compound having 2 or 3 carboxylic acid halides, for example, one type selected from the compound group consisting of trimesoyl chloride (TMC), isophthaloyl chloride and terephthaloyl chloride, or a mixture of two or more types thereof can be preferably used, and preferably, trimesoyl chloride (TMC) can be used.

In one embodiment of the present specification, the organic solvent preferably does not participate in an interfacial polymerization reaction, and an aliphatic hydrocarbon solvent, for example, one or more types selected from among freons, alkane having 5 to 12 carbon atoms and isoparaffin-based solvents, an alkane mixture material, can be included. Specifically, one or more types selected from among hexane, heptane, octane, nonane, decane, undecane, dodecane, cyclohexane, IsoPar (Exxon), IsoPar G (Exxon), ISOL-C (SK Chem) and ISOL-G (Exxon) can be used, however, the organic solvent is not limited thereto.

A content of the acyl halide compound can be from 0.05 wt % to 1 wt %, preferably from 0.08 wt % to 0.8 wt %, and more preferably from 0.05 wt % to 0.6 wt % based on 100 wt % of the organic solution.

A uniform polyamide layer can be prepared when the acyl halide compound content is in the above-mentioned range.

In one embodiment of the present specification, the aqueous solution including an amine compound can further include a surfactant.

When interfacial polymerizing the polyamide active layer, polyamide is quickly formed at an interface of an aqueous solution layer and an organic solution layer, and herein, the surfactant makes the layer thin and uniform so that the amine compound present in the aqueous solution layer readily migrates to the organic solution layer to form a uniform polyamide active layer.

In one embodiment of the present specification, the surfactant can be selected from among nonionic, cationic, anionic and amphoteric surfactants. According to one embodiment of the present specification, the surfactant can be selected from among sodium lauryl sulfate (SLS); alkyl ether sulfates; alkyl sulfates; olefin sulfonates; alkyl ether carboxylates; sulfosuccinates; aromatic sulfonates; octylphenol ethoxylates; ethoxylated nonylphenols; alkyl poly(ethylene oxide); copolymers of poly(ethylene oxide) and poly(propylene oxide); alkyl polyglucosides such as octyl glucoside and decyl maltoside; aliphatic acid alcohols such as cetyl alcohol, oleyl alcohol, cocamide MEA, cocamide DEA, alkyl hydroxyethyldimethylammonium chloride, cetyltrimethyl-ammonium bromide, cetyltrimethylammonium chloride, hexadecyltrimethylammonium bromide and hexadecyltrimethyl-ammonium chloride; and alkyl betaines. Specifically, the surfactant can be SLS, octylphenol ethoxylates or ethoxylated nonylphenols.

Particularly, when using sodium lauryl sulfate (SLS) as the surfactant, the SLS is highly soluble in water due to its high affinity for water and oil (hydrophile-lipophile balance, HLB), and by having a high critical micelle concentration (CMC), formation of the polyamide active layer is not inhibited even when added in excess.

In one embodiment of the present specification, a content of the surfactant can be from 0.005 wt % to 0.5 wt % based on 100 wt % of the aqueous solution including an amine compound.

In one embodiment of the present specification, a moisture content of the water-treatment membrane measured after drying for 1 minute to 3 minutes at 50° C. to 95° C. immediately after the step (a) is from 0.1% to 3% and preferably from 0.5% to 1.5%, and a measurement error is ±0.5%.

(b) Pretreating Polyamide Active Layer

In one embodiment of the present specification, the pretreatment can be conducted through a process of bringing the polyamide active layer prepared in the step (a) into contact with a pretreatment solution including water.

In one embodiment of the present specification, the contact can be conducted using a method such as dipping, spraying or coating, and can be preferably conducted through dipping.

In one embodiment of the present specification, the step (b) can be conducted at 10° C. to 80° C. and preferably at 40° C. to 80° C., and can be conducted for 1 second to 5 minutes, preferably for 1 second to 3 minutes, and more preferably for second to 1 minute. A higher temperature of the pretreatment solution has advantages of shortening the process time since the rate of removing monomers remaining after forming the polyamide active layer is higher, and increasing the L* value. However, a temperature of higher than 80° C. can cause denaturation of the non-woven fabric.

In one embodiment of the present specification, forming the pretreatment solution only with water can be advantageous in that the temperature of the solution is readily adjusted, and there is no concern over a secondary reaction caused by constituents other than water and gas generation and the like resulting therefrom.

In one embodiment of the present specification, the pretreatment solution can further include one or more types of acidic salts or basic salts. When the pretreatment solution further includes an acidic salt or a basic salt, osmosis of the polyamide active layer is induced, and the degree of pore shrinkage and expansion can be controlled depending on the concentration, which is advantageous in controlling polyamide active layer performance.

In one embodiment of the present specification, the acidic salt is sodium sulfate, calcium sulfate, potassium sulfate, sodium phosphate, calcium phosphate or potassium phosphate, and the basic salt is sodium carbonate, calcium carbonate or potassium carbonate.

In one embodiment of the present specification, the salt can be included in 0.1 wt % to 30 wt % based on 100 wt % of the pretreatment solution.

Through such a pretreatment process, swelling of the polyamide active layer is induced, which can increase flux.

In one embodiment of the present specification, a moisture content of the water-treatment membrane measured immediately after the step (b) is from 20% to 50% and preferably from 30% to 40%, and a measurement error is ±5%.

This means that the moisture content greatly increases compared to immediately after the step (a) due to the pretreatment process, and it can be identified whether the pretreatment process is applied or not through measuring a moisture content before hypochlorite treatment of the step (c).

(c) Bringing Hypochlorite Solution into Contact with Pretreated Polyamide Active Layer In one embodiment of the present specification, the method for manufacturing a water-treatment membrane includes bringing a hypochlorite solution having a concentration of 50 ppm to 450 ppm into contact with the polyamide active layer in order to enhance salt rejection and flux.

In one embodiment of the present specification, the contact can be conducted using a method of coating a hypochlorite solution on the polyamide active layer or dipping the polyamide active layer into a hypochlorite solution. Among these, a method of coating a hypochlorite solution on the polyamide active layer is preferred since the treatment condition is readily controlled and uniformity of the hypochlorite effect is excellent.

Particularly, using a slot die coating method has advantages in that a concentration of active chlorine participating on the membrane surface can be maintained uniformly, and a sufficient chlorine treatment effect is obtained with a hypochlorite solution having a low concentration by providing a pressurizing condition.

In one embodiment of the present specification, the hypochlorite solution is an aqueous sodium hypochlorite (NaOCl) solution.

In one embodiment of the present specification, the hypochlorite solution can have a concentration of 50 ppm to 450 ppm, preferably 100 ppm to 350 ppm, and more preferably 150 ppm to 350 ppm.

When the hypochlorite solution has a concentration of 50 ppm or greater, a sufficient hypochlorite effect can be obtained, and when the hypochlorite solution has a concentration of 450 ppm or less, a hypochlorite effect can be obtained without reducing durability of the water-treatment membrane.

In one embodiment of the present specification, the contacting of a hypochlorite solution can be conducted using a method of dipping the water-treatment membrane into a hypochlorite solution for 1 second to 1 minute.

According to one embodiment of the present specification, the hypochlorite solution can have a temperature of 20° C. to 80° C. Preferably, the temperature can be from 20° C. to 30° C. When the hypochlorite solution temperature is in the above-mentioned range, reactivity of active chlorine is optimized. When the hypochlorite solution has a temperature of lower than 20° C., an effect of improving performance of the water-treatment membrane is insignificant and managing the solution is difficult as well. When the solution temperature is higher than 80° C., a structure of the water-treatment membrane is destroyed, which can weaken durability of the membrane.

In one embodiment of the present specification, a moisture content of the water-treatment membrane measured immediately after the step (c) is from 20% to 50% and preferably from 30% to 40%, and a measurement error is ±5%.

(d) Forming Protective Layer on Hypochlorite Treated Polyamide Active Layer

In one embodiment of the present specification, the method for manufacturing a water-treatment membrane can further include, after the step (c), (d) forming a protective layer by coating an aqueous glycerin solution on the polyamide active layer.

In one embodiment of the present specification, a content of glycerin is from 5 wt % to 30 wt %, preferably from 10 wt % to 30 wt % and more preferably from 10 wt % to 20 wt % in 100 wt % of the aqueous glycerin solution.

In one embodiment of the present specification, a moisture content of the water-treatment membrane measured after drying for 1 minute to 2 minutes at 50° C. to 95° C. in a dryer immediately after the step (d) is from 0.1% to 5% and preferably from 1.5% to 3.5%, and a measurement error is ±1%.

(e) Rolling Water-Treatment Membrane in One or More Layers

In one embodiment of the present specification, a method for manufacturing a water-treatment module includes, (a) forming a polyamide active layer on a porous support by interfacial polymerizing an amine compound and an acyl halide compound;

(b) pretreating the polyamide active layer by bringing the polyamide active layer into contact with a pretreatment solution including water;

(c) manufacturing a water-treatment membrane by bringing a hypochlorite solution having a concentration of 50 ppm to 450 ppm into contact with the pretreated polyamide active layer; and (e) rolling the water-treatment membrane in one or more layers.

In one embodiment of the present specification, the steps (a) to (c) can be conducted in the same manner as in the method for manufacturing a water-treatment membrane described above.

In one embodiment of the present specification, each constitution of the method for manufacturing a water-treatment module can cite the descriptions on each constitution of the method for manufacturing a water-treatment membrane.

In one embodiment of the present specification, the method for manufacturing a water-treatment module can employ methods commonly used in the art except that the method for manufacturing a water-treatment membrane described above is used. For example, processes of tricoater packaging, membrane prepping, manual rolling, end trimming, fiber reinforced polymer coating (FRP coating) and the like can be consecutively conducted in the manufacture.

In one embodiment of the present specification, a moisture content of the water-treatment membrane measured after dissembling the water-treatment module to the water-treatment membrane after the step (e) is from 0.1% to 5% and preferably from 1.5% to 3.5%.

Water-Treatment Membrane

In one embodiment of the present specification, the water-treatment membrane includes a porous support; and a polyamide active layer provided on the porous support and including chlorine on a surface thereof, wherein CIE L*a*b* color coordinate values after storing for 30 days or longer at 25° C. to 80° C. satisfy the following <Equation 1> to <Equation 3>.

$$91 < L^* < 97 \qquad \text{<Equation 1>}$$

$$-1.5 < a^* < 1.5 \qquad \text{<Equation 2>}$$

$$-1.5 < b^* < 8 \qquad \text{<Equation 3>}$$

In the water-treatment membrane in one embodiment of the present specification, CIE L*a*b* color coordinate values after storing for 30 days or longer at 25° C. to 80° C. can satisfy 92<L*<97, −1.2<a*<1.0 and −1.0<b*<7.

In the water-treatment membrane in one embodiment of the present specification, CIE L*a*b* color coordinate values after storing for 30 days or longer at 25° C. to 80° C. can satisfy 94.5<L*<96.6, −1.0<a*<0.3 and 4.9<b*<6.7.

In one embodiment of the present specification, a storage temperature of the water-treatment membrane is preferably from 25° C. to 60° C., and more preferably room temperature.

In the water-treatment membrane in one embodiment of the present specification, CIE L*a*b* color coordinate values after storing for 30 days or longer, preferably for 30 days or longer and 60 days or shorter, and more preferably for 30 days satisfy <Equation 1> to <Equation 3>.

In one embodiment of the present specification, the 'storing for 30 days or longer' can mean storing for 30 days or longer from the date of completing a final product after completing manufacture of all components forming the water-treatment membrane.

In one embodiment of the present specification, the 'storing for 30 days or longer' can mean storing for 30 days or longer from the date of obtaining a commercially available water-treatment membrane.

In examples of the present specification, CIE L*a*b* color coordinate values at the beginning are measured within 3 minutes after forming a protective layer, a final step of the water-treatment membrane manufacturing process, and CIE L*a*b* color coordinate values are measured again after storing for 30 days from the beginning.

In one embodiment of the present specification, the water-treatment membrane can further include a protective layer including glycerin on the polyamide active layer.

In one embodiment of the present specification, the protective layer can have a thickness of 10 nm to 50 nm, and when the thickness is in the above-mentioned range, there is an advantage of increasing flux without losing rejection.

The protective layer thickness can be measured using an image observed with a scanning electron microscope (SEM). Specifically, after cutting a cross section of a 0.2 cm membrane sample through a microtome, platinum (Pt) is coated thereon, and the protective layer thickness is measured using a scanning electron microscope (SEM) to calculate an average value.

In the water-treatment membrane in one embodiment of the present specification, CIE L*a*b* color coordinate values satisfy <Equation 1> to <Equation 3> even after storing for 30 days or longer at 25° C. to 80° C., and this means that the manufactured water-treatment membrane has a small degree of discoloration. When a large amount of unreacted monomers remain during the water-treatment membrane manufacturing process, the degree of discoloration is severe, and in this case, the monomer acts as an impurity declining performance of the water-treatment membrane. In other words, the water-treatment membrane according to one embodiment of the present specification has excellent durability.

In addition, by identifying whether CIE L*a*b* color coordinate values of the water-treatment membrane at the beginning and after storing for 30 days satisfy <Equation 1> to <Equation 3>, applications of the pretreatment process and the hypochlorite process according to one embodiment of the present specification can be identified.

In one embodiment of the present specification, a chlorine element content when conducting an elemental analysis on the water-treatment membrane surface is greater than 0 at % and less than or equal to 3 at %, preferably greater than or equal to 0.1 at % and less than or equal to 3 at %, and more preferably greater than or equal to 1.0 at % and less than or equal to 2.7 at %.

The elemental analysis in the present specification can be conducted through X-ray photoelectron spectroscopy (XPS) or electron spectroscopy for chemical analysis (ESCA).

FIG. 1 illustrates the water-treatment membrane according to one embodiment of the present specification. Specifically, FIG. 1 illustrates the water-treatment membrane in which a non-woven fabric (100), a porous support (200) and a polyamide active layer (300) are consecutively provided, and as raw water including impurities (400) flows into the polyamide active layer (300), purified water (500) is discharged through the non-woven fabric (100), and concentrated water (600) is discharged outside failing to pass through the polyamide active layer (300). However, structures of the water-treatment membrane according to one embodiment of the present specification are not limited to the structure of FIG. 1, and additional constitutions can be further included.

In one embodiment of the present specification, the water-treatment membrane can be a microfiltration membrane, an ultrafiltration membrane, a nanofiltration membrane or a reverse osmosis membrane, and can specifically be a reverse osmosis membrane.

Water-Treatment Module

In one embodiment of the present specification, the water-treatment module includes one or more of the water-treatment membranes according to one embodiment of the present specification.

Specific types of the water-treatment module are not particularly limited, and examples thereof can include a plate & frame module, a tubular module, a hollow & fiber module, a spiral wound module or the like. In addition, as long as the water-treatment module includes the water-treatment membrane according to one embodiment of the present specification described above, the water-treatment module is not particularly limited in other constitutions and manufacturing methods, and general means known in the art can be employed without limit.

Meanwhile, the water-treatment module according to one embodiment of the present specification has excellent salt rejection and boron rejection, and therefore, is useful in water-treatment systems such as household/industrial water-purification systems, sewage treatment systems or sea to fresh water treatment systems.

Hereinafter, the present specification will be described in detail with reference to examples in order to specifically describe the present specification. However, examples according to the present specification can be modified to various different forms, and the scope of the present specification is not construed as being limited to the examples described below. The examples of the present specification are provided in order to more fully describe the present specification to those having average knowledge in the art.

PREPARATION EXAMPLE 18 wt % of a polysulfone solid was introduced into N,N-dimethylformamide (DMF) and dissolved for 12 hours or longer at 80° C. to 85° C. to obtain a uniform liquid phase. This solution was cast to a thickness of 150 μm on a non-woven fabric made of a polyester material and having a thickness of 95 μm to 100 μm. Then, the cast non-woven fabric was placed in water to prepare a porous polysulfone support. Herein, the support was prepared to have a width of 400 nm.

On the porous polysulfone support, a solution including 10 wt % of triethylammonium camphorsulfonate (TEACSA) with respect to the whole solution and water was coated using a slot die coating method.

After that, an aqueous solution including 5 wt % of metaphenylenediamine (mPD) with respect to the whole aqueous solution was coated on the porous polysulfone support using a slot die coating method at a rate of 16 m/min to form an aqueous solution layer. Furthermore, an extra aqueous solution generated during the coating was removed using an air knife.

On the aqueous solution layer, an organic solution including 0.3 wt % of trimesoyl chloride (TMC) and 99.7 wt % of an organic solvent (IsoPar G) with respect to the whole organic solution was coated using a slot die coating method at a rate of 16 m/min. Then, the result was dried at 95° C. until all the liquid components evaporated, and then washed with ultrapure distilled water (DIW) to manufacture a water-treatment membrane. Herein, the membrane was prepared to have a width of 380 nm.

EXAMPLE 1

After pretreating the water-treatment membrane of the preparation example using a method of dipping into water for 30 seconds at room temperature, hypochlorite treatment was conducted using a method of dipping the pretreated water-treatment membrane into a 100 ppm hypochlorite solution at 25° C. After that, a protective layer was formed using a method of coating 10 wt % of an aqueous glycerin solution on the hypochlorite treated polyamide active layer to complete a water-treatment membrane.

The completed water-treatment membrane was rolled in multiple layers to manufacture a round-shaped cylindrical water-treatment module having a diameter of 1.8 inches and a length of 12 inches.

EXAMPLE 2

A water-treatment module was manufactured in the same manner as in Example 1 except that the temperature of the water, a pretreatment solution, was adjusted to 40° C. or higher, and the concentration of the hypochlorite solution was changed to 300 ppm.

COMPARATIVE EXAMPLE 1

A round-shaped cylindrical water-treatment module having a diameter of 1.8 inches and a length of 12 inches was manufactured by rolling the water-treatment membrane of the preparation example in multiple layers.

COMPARATIVE EXAMPLE 2

A water-treatment module was manufactured in the same manner as in Example 1 except that the concentration of the hypochlorite solution was changed to 10 ppm.

COMPARATIVE EXAMPLE 3

A water-treatment module was manufactured in the same manner as in Example 1 except that the pretreatment was not conducted.

COMPARATIVE EXAMPLE 4

A round-shaped cylindrical water-treatment module having a diameter of 1.8 inches and a length of 12 inches was manufactured by rolling the water-treatment membrane of the preparation example in multiple layers, and then hypochlorite treatment was conducted on the manufactured water-treatment module under a condition of 25° C., 20 ppm hypochlorite solution and 10 psi pressurizing.

EXPERIMENTAL EXAMPLE 1

Evaluation of Water-Treatment Module Performance

For each of the water-treatment modules manufactured according to the examples and the comparative examples, performance was evaluated using a salt water containing 250 ppm NaCl.

After device stabilization was confirmed by operating the device for approximately 1 hour by passing the salt water with 60 psi and a flow rate of 2 L/min, flux (GFD, gallon/ft²·day) was calculated by measuring the amount of water permeated for 10 minutes at 25° C., and salt concentrations before and after the permeation were analyzed using a conductivity meter to calculate salt rejection. The results are as shown in the following Table 1.

TABLE 1

|  | Pretreatment | Hypochlorite Solution Concentration (ppm) | Salt Rejection (%) | Flux (GFD) |
| --- | --- | --- | --- | --- |
| Example 1 | ○ | 100 | 98.34 | 16.54 |
| Example 2 | ○ | 300 | 98.57 | 19.73 |
| Comparative Example 1 | X | — | 98.02 | 14.5 |
| Comparative Example 2 | ○ | 10 | 98.17 | 15.92 |
| Comparative Example 3 | X | 100 | 98.40 | 14.8 |
| Comparative Example 4 | X | 20 (Module State) | 98.26 | 16.46 |

Through the results of Table 1, it was identified that Examples 1 and 2 had much higher flux than the comparative examples while salt rejection is either similar to or higher than the comparative examples.

EXPERIMENTAL EXAMPLE 2

Measurement of Moisture Content

The moisture content in each step of the manufacturing process of the examples and the comparative examples was measured under conditions as follows after drying the sample for 1 minute and 30 seconds at 100° C. using an IR heater, and through changes in the weight before and after the drying.

Immediately after step (a): measure a moisture content within 3 minutes after drying the active layer for 2 minutes in a 80° C. dryer after the interfacial polymerization Immediately after step (b): measure a moisture content within 3 minutes after the pretreatment Immediately after step (c): measure a moisture content within 3 minutes after the hypochlorite treatment Immediately after step (d): measure a moisture content within 3 minutes after drying the protective layer for 1 minute and 30 seconds in a 80° C. dryer after the glycerin coating After step (e): measure a moisture content within 3 minutes after manufacturing the module and then dissembling the module again to the water-treatment membrane state The results are described in the following Table 2.

TABLE 2

|  | Immediately After Preparing Polyamide Active Layer (Step (a))(%) | Immediately After Pretreatment (Step (b))(%) | Immediately After Hypochlorite Treatment (Step (c))(%) | Immediately After Forming Protective Layer (Step (d))(%) | After Manufacturing Water-Treatment Module (Step (e))(%) |
| --- | --- | --- | --- | --- | --- |
| Example 1 | 1 ± 0.5 | 35 ± 5 | 35 ± 5 | 2.5 ± 1 | 2.5 ± 1 |
| Example 2 | 1 ± 0.5 | 35 ± 5 | 35 ± 5 | 2.5 ± 1 | 2.5 ± 1 |

TABLE 2-continued

|  | Immediately After Preparing Polyamide Active Layer (Step (a))(%) | Immediately After Pretreatment (Step (b))(%) | Immediately After Hypochlorite Treatment (Step (c))(%) | Immediately After Forming Protective Layer (Step (d))(%) | After Manufacturing Water-Treatment Module (Step (e))(%) |
|---|---|---|---|---|---|
| Comparative Example 1 | 1 ± 0.5 | No Pretreatment (Maintain 1 ± 0.5) | No Hypochlorite (Maintain 1 ± 0.5) | 2.5 ± 1 | 2.5 ± 1 |
| Comparative Example 2 | 1 ± 0.5 | 35 ± 5 | 35 ± 5 | 2.5 ± 1 | 2.5 ± 1 |
| Comparative Example 3 | 1 ± 0.5 | No Pretreatment (Maintain 1 ± 0.5) | 35 ± 5 | 2.5 ± 1 | 2.5 ± 1 |
| Comparative Example 4 | 1 ± 0.5 | No Pretreatment (Maintain 1 ± 0.5) | No Hypochlorite (Maintain 1 ± 0.5) | 2.5 ± 1 | 35 ± 5 |

Through the results of Table 2, it was seen that, when the pretreatment process was used as in Examples 1 and 2 and Comparative Example 2, s moisture content before the hypochlorite treatment was measured to be 35±5%. In addition, it was identified that the moisture content was measured high at 35±5% when the hypochlorite treatment was conducted in the module step as in Comparative Example 4, whereas the moisture content was low at 2.5±1% after manufacturing the module in Examples 1 and 2 and Comparative Examples 1 to 3 conducting the hypochlorite treatment in the membrane step. In other words, through the moisture content in each step, it was identified which process was used in which step.

EXPERIMENTAL EXAMPLE 3

Measurement of Color Coordinate Values of Water-Treatment Membrane

For each of the water-treatment membranes manufactured in the examples and the comparative examples, the membrane was cut to a 5 cm×5 cm size sample before being rolled to a water-treatment module, and using a CM-3600D spectrophotometer of Konica Minolta, Inc., CIE L*a*b* color coordinate values were measured based on specular component included (SCI).

In addition, after storing the sample for 30 days at room temperature, color coordinate values were measured in the same manner, and the results are shown in the following Table 3.

sample and the color coordinate values measured after storing for 30 days all satisfied <Equation 1> to <Equation 3>. It was seen through color coordinate values that the degree of discoloration was severe in the comparative examples, and this means that there are many residual monomers that were not able to be changed to a polymer by participating in the reaction, and means that such residual monomers can act as an impurity afterward declining performance of the membrane.

In addition, it was identified that, in Example 2 having a pretreatment solution temperature of 40° C. or higher, the L* value increased after storing for 30 days compared to the value at the beginning, whereas, in Example 1, the L* value decreased after storing for 30 days compared to the value at the beginning. Through this, it was identified that, when the pretreatment solution temperature was 40° C. or higher, there were no substances subject to an oxidation reaction even when the time of storage increased since monomers remaining after forming the polyamide active layer were quickly removed, and as a result, an effect of maintaining or increasing the L* value of the membrane was obtained.

EXPERIMENTAL EXAMPLE 4

Measurement of Chlorine Content on Water-Treatment Membrane Surface

For each of the water-treatment membranes manufactured in Examples 1 and 2 and Comparative Example 1, the content of each element obtained through a result of elemen-

TABLE 3

|  | L* | | a* | | b* | |
|---|---|---|---|---|---|---|
|  | At the Beginning | After Storing for 30 Days | At the Beginning | After Storing for 30 Days | At the Beginning | After Storing for 30 Days |
| Example 1 | 95.5 | 94.5 | −0.5 | 0.3 | 4.9 | 6.7 |
| Example 2 | 96.1 | 96.6 | −1.0 | −0.8 | 4.9 | 5.4 |
| Comparative Example 1 | 97.2 | 97.4 | −0.4 | −0.4 | −0.8 | 1.2 |
| Comparative Example 2 | 91.7 | 89.6 | 1.1 | 2.7 | 5.6 | 10.1 |
| Comparative Example 3 | 91.6 | 81.3 | 1.2 | 7.3 | 10.1 | 19.2 |
| Comparative Example 4 | 97.2 | 92.3 | −0.9 | 2.5 | −0.9 | 15.9 |

Through the results of Table 3, it was identified that, in the water-treatment membrane according to one embodiment of the present specification, the color coordinate values at the beginning measured within 3 minutes after preparing the sample and the color coordinate values measured after tal analysis on the surface is shown in the following Table 4. In addition, graphs of elemental analysis results on Example 1 and Comparative Example 1 are shown in FIG. 2 and FIG. 3.

In the elemental analysis, an optoelectronic spectrometer (XPS or ESCA, model name: K-Alpha, Thermo Fisher Scientific Inc) was used, and while using Al Kα (X-ray spot size: 400 μm) as an X-ray source, analyses were made on 3 or more spots per sample, and data were collected by scanning 20 or more times per spot.

TABLE 4

| Element | Cl(at %) | C(at %) | N(at %) | O(at %) |
|---|---|---|---|---|
| Example 1 | 1.0 ± 10.0 | 70.7 ± 0.1 | 9.6 ± 0.1 | 16.0 ± 0.3 |
| Example 2 | 2.7 ± 0.0 | 70.7 ± 0.3 | 10.0 ± 0.1 | 15.6 ± 0.1 |
| Comparative Example 1 | 0 | 72.2 ± 0.3 | 10.9 ± 0.2 | 1.6 ± 0.3 |

Through Table 4, it was identified that, whereas a chlorine element was detected on the surfaces of Example 1 and Example 2, a chlorine element was not detected on the surface of Comparative Example 1, and through this, whether the manufacturing method according to the present disclosure is used in the manufacturing process can be identified in a membrane state.

The invention claimed is:

1. A water-treatment membrane comprising:
   a porous support;
   a polyamide active layer provided on the porous support and including chlorine on a surface thereof, wherein a chlorine element content measured by an elemental analysis on the surface of the polyamide active layer is greater than 0 at % and less than or equal to 3 at %; and
   a protective layer including glycerin on the polyamide active layer,
   wherein CIE L*a*b* color coordinate values after storing for 30 days or longer at 25° C. to 80° C. satisfy the following <Equation 1> to <Equation 3>:

$$91 < L^* < 97 \quad \text{<Equation 1>}$$

$$-1.5 < a^* < 1.5 \quad \text{<Equation 2>}$$

$$-1.5 < b^* < 8 \quad \text{<Equation 3>}.$$

2. A water-treatment module comprising one or more of the water-treatment membranes of claim 1.

3. A method for manufacturing the water-treatment membrane of claim 1, the method comprising:
   (a) forming a polyamide active layer on a porous support by interfacial polymerizing an amine compound and an acyl halide compound;
   (b) pretreating the polyamide active layer by bringing the polyamide active layer into contact with a pretreatment solution including water;
   (c) bringing a hypochlorite solution having a concentration of 50 ppm to 300 ppm into contact with the pretreated polyamide active layer for 1 second to 1 minute; and
   (d) forming a protective layer by coating an aqueous glycerin solution on the polyamide active layer.

4. The method of claim 3, wherein a moisture content of the water-treatment membrane measured immediately after (a) is from 0.1% to 3%.

5. The method of claim 3, wherein a moisture content of the water-treatment membrane measured immediately after (b) is from 20% to 50%.

6. The method of claim 3, wherein a moisture content of the water-treatment membrane measured immediately after (d) is from 0.1% to 5%.

7. The method of claim 3, wherein the pretreatment solution further includes one or more types of an acidic salt or a basic salt.

8. The method of claim 3, wherein the hypochlorite solution is an aqueous sodium hypochlorite solution.

* * * * *